United States Patent Office 3,007,846
Patented Nov. 7, 1961

3,007,846
ALKALI METAL SALTS OF NITROFURANTOIN
Gabriel Gever, Oxford, and James G. Vincent, Jr., Norwich, N.Y., assignors to The Norwich Pharmacal Company, Norwich, N.Y., a corporation of New York
No Drawing. Filed Mar. 4, 1959, Ser. No. 797,037
4 Claims. (Cl. 167—58)

This invention relates to chemotherapeutic agents and aims to provide new chemotherapeutically active chemical compounds having ready solubility in aqueous media. More particularly this invention is concerned with alkali metal salts of nitrofurantoin and solvated adducts thereof. They may be described by the formula:

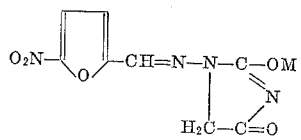

wherein M is a member of the group consisting of sodium and potassium, and the solvated adducts thereof.

Nitrofurantoin (N-(5-nitro-2-furfurylidene)-1-aminohydantoin) has proved to be an extremely valuable chemotherapeutic agent when administered orally. However, attempts to provide this agent in a form suitable for parenteral administration, e.g. intravenously, have not been successful. This is evidently due primarily to its lack of solubility in the ordinary physiologically tolerable menstrua. At times inexplicable adverse reactions have been encountered. These may be caused by the solvent employed, for instance, a liquid polyethylene glycol; or by an interacting influence between drug and solvent when subjected to heat sterilizing techniques.

We have found that the new crystalline alkali metal salts of nitrofurantoin that we have invented are stable, uniform in composition and effective chemotherapeutic agents. They are readily soluble in physiologically acceptable media. Such solubility permits their use parenterally, e.g. by intravenous infusion, when dissolved in sterile isotonic saline or sterile 5% dextrose solution. For such use, a parenteral solution containing an amount of salt calculated to supply a dose of 180 mg. of nitrofurantoin in 500 cc. of diluent may be readily prepared.

In the practice of our invention, the crystalline alkali metal salts of nitrofurantoin can be readily prepared by treating a suspension of nitrofurantoin with a reagent capable of supplying an alkali metal cation. The reaction is suitably effected at ambient temperature, and the salts are separated as crystals from the reaction medium.

As a vehicle for the reaction, an inert liquid is employed. Such a liquid may be an alkanol, dioxane, dimethylformamide, dimethylsulfoxide, water and mixtures thereof. Of these, we presently prefer an alkanol containing from one to four carbon atoms.

As a reagent capable of supplying an alkali metal cation, alkoxides of sodium and potassium as well as the hydroxides of these metals are suitable. Of the alkoxides, we prefer one which is commercially available such as sodium methoxide.

Crystallization of the salts from the reaction medium can be facilitated by cooling, concentration or addition of precipitating liquids thereto may be practiced. When the reaction medium is an alkanol and the alkali metal supplying reagent an alkoxide of sodium or potassium, crystallization of the salt of nitrofurantoin is readily effected.

The obtained salts are washed with an inert liquid. Thus obtained, the salts oftentimes contain bound thereto a quantity of the vehicle employed as the reaction medium. For instance if an alkanol serves as the medium, an alcoholate of the salt is obtained. If water is present, a hydrate may be obtained. At times a combined alcoholate-hydrate results. Such a composition may be represented by the formula:

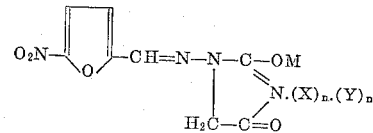

wherein:

X represents an alkanol such as methanol,
Y represents water, and
n represents an integer from zero to one.

The obtained salts are dried at elevated temperature. In the course of such treatment they tend to lose any adhered solvent. For instance, we have found that upon heating to about 110° C. the salts may be dealcoholated and/or dehydrated.

The process of preparing our new compounds which we currently prefer to employ in the practice of our invention consists in adding nitrofurantoin to methanol under agitation and then introducing to the stirred suspension sodium hydroxide dissolved in methanol. The mixture is stirred at room temperature for about one hour and then cooled in an ice bath with continued stirring for about one and one-quarter hours. The crystals are filtered from the mixture and washed with cold methanol. Thereafter they are dried under vacuum at room temperature for a brief time and further dried at 60° C. The crystals may be recrystallized from methanol. To secure crystals free from any adhered methanol, drying is carried out at about 110° C. The crystals may be sterilized at 160° C. and are readily dissolved in sterile distilled water, isotonic sodium chloride or 5% dextrose solution to produce parenterally useful solutions containing the desired dosage of nitrofurantoin.

In order that our invention may be readily available to those skilled in the art, the following specific examples are described briefly:

Example I

To 2500 cc. of methanol is added, with stirring, 440 gm. of nitrofurantoin. To this stirred suspension is introduced, at a temperature of about 20–25° C., 80 gm. of sodium hydroxide dissolved in 2500 cc. of methanol. The mixture is stirred at room temperature for about one hour then cooled by means of an ice bath and stirred for an additional one and one-quarter hours; filtered and washed with cold methanol (2×250 cc.). The crystals are dried at 60° C. for about one and one-quarter hours. The amount of crystals thus obtained is 440 gm.

$E_{1\,cm.}^{1\%} = 587$ at 3675 A.
148 at 3050 A.
417 at 2650 A.

Sodium=7.65% (theoretical=8.85%)
Nitrofurantoin=77.95% (theoretical=91.15%)
Solvent=14.40%.

The crystals are subjected to drying at 110° C. for about 110 minutes and then analyzed:

Sodium=8.85%
Nitrofurantoin=92.00%

To prepare a composition suitable for intravenous infusion a quantity of the crystals sufficient to produce a concentration of 375 mg. of nitrofurantoin in one liter of sterile distilled water is sterilized at 160° C. for one hour and then placed in the diluent. Such a composition has a pH of about 7.95. Other diluents such as isotonic sodium chloride, 5% dextrose solution and sodium lactate solution serve equally well.

*Example II*

To a suspension of 45 gm. of nitrofurantoin in 250 cc. of methanol is added with stirring a solution of 10 gm. of sodium methoxide in 250 cc. of methanol. The mixture is cooled and then filtered. The crystals obtained (35 gm.) are washed with cold methanol and dried initially at 60° C. and finally at 110° C.

$E_{1cm.}^{1\%} = 664$ at 3675 A.

Sodium=8.35% (theoretical=8.85%)
Nitrofurantoin=88.18% (theoretical=91.15%)

Further drying at 110° C. and handling to exclude atmospheric moisture gave a product similar to that of Example I. A 250 mg. sample of it is placed in a vial and heated to 160° C. for one hour. It is then dissolved in 500 cc. of sterile isotonic saline to yield a solution having a pH of about 7.8.

*Example III*

To a suspension of 23.8 gm. of nitrofurantoin in 400 cc. of water is added dropwise with stirring a solution of 3.6 gm. of sodium hydroxide dissolved in 100 cc. of water. After filtering to remove any material not taken into solution, 500 cc. of isopropanol is added and the solution cooled for about one hour in an ice bath. The crystals (17.4 gm.) are filtered and washed with cold isopropanol and then dried for one and one-half hours at about 110° C. in vacuo.

$E_{1cm.}^{1\%} = 649$ at 3675 A.
      165 at 3050 A.
      460 at 2660 A.

Sodium=7.8 (theoretical=8.85%)
Nitrofurantoin=86.0% (theoretical=91.15%)

*Example IV*

To 250 cc. of methanol is added with stirring 44 gm. of nitrofurantoin. To the stirred suspension is added, at room temperature, a solution of 11.2 gm. of potassium hydroxide in 250 cc. of methanol. The mixture becomes thick and it is advisable to add methanol (500 cc.) to facilitate stirring. The slurry is stirred for about one hour, then chilled for 2¼ hours. The yellow product is filtered and washed by slurrying once with 500 cc. of methanol and once with 250 cc. After drying for about 2 hours at 65° C., the crude material weighs 49 gm. Purification is accomplished by treating it with 250 cc. of methanol and 150 cc. of water, bringing the suspension to boiling, filtering hot and cooling. The crystals obtained are recrystallized from 2:1 methanol:water mixture to yield potassium nitrofurantoin hydrate.

Calcd.: 13.25% (potassium), 6.13% (water),

607 $E_{1cm.}^{1\%}$ at 3675 A.

Found: 13.8% (potassium), 6.04% (water),

606 $E_{1cm.}^{1\%}$ at 3675 A.

By drying in vacuum at 100° C., anhydrous potassium nitrofurantoin may be obtained.

Calcd.: 14.1% (potassium),

646 $E_{1cm.}^{1\%}$ at 3675 A.

Found: 13.15, 12.8% (potassium), 645, 649 $E_{1cm.}^{1\%}$ at 3675 A.

*Example V*

A solution of 1.55 gm. of potassium in 20 cc. of isopropanol is added to a suspension of 10 gm. of nitrofurantoin in 100 cc. of methanol. The mixture thickens considerably and 100 cc. of water is added. It is heated to boiling and filtered hot. The insoluble residue from this treatment is boiled with about 200 cc. of 2:1 methanol:water mixture, filtered hot and cooled. The crystals that form are filtered and dried at 65° C. This product is identical with the hydrate obtained in Example IV ($E_{1cm.}^{1\%} = 604$ at 3675 A.)

What is claimed is:
1. A member of the group consisting of a crystalline salt of nitrofurantoin having chemotherapeutic activity and ready solubility in aqueous media, and represented by the formula:

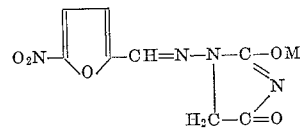

in which M represents a member of the group consisting of sodium and potassium, and adducts thereof solvated with at least one member of the group consisting of water and lower alkanol.

2. The crystalline monosodium salt of nitrofurantoin.
3. The crystalline monopotassium salt of nitrofurantoin.
4. A sterile aqueous solution having chemotherapeutic activity upon intravenous administration, which comprises about 1 part of an alkali metal salt of nitrofurantoin selected from the group consisting of the sodium and potassium salts of nitrofurantoin, and from about 2,000 to about 2,500 parts of a physiologically acceptable solvent.

References Cited in the file of this patent

UNITED STATES PATENTS

| | | |
|---|---|---|
| 2,366,211 | Spurlock | Jan. 2, 1945 |
| 2,591,103 | Spurlock | Apr. 1, 1952 |
| 2,610,181 | Hayes | Sept. 9, 1952 |
| 2,666,063 | Spurlock | Jan. 12, 1954 |
| 2,711,413 | Campaigne | June 21, 1955 |
| 2,716,648 | Jules et al. | Aug. 30, 1955 |
| 2,726,241 | Gever et al. | Dec. 5, 1955 |
| 2,798,068 | Gever | July 2, 1957 |
| 2,799,686 | Carrara | July 16, 1957 |
| 2,802,022 | Gever | Aug. 6, 1957 |

FOREIGN PATENTS

| | | |
|---|---|---|
| 788,373 | Great Britain | Jan. 2, 1958 |